(No Model.)  3 Sheets—Sheet 1.

J. B. ROOT.
WELDING MACHINE.

No. 346,828. Patented Aug. 3, 1886.

Witnesses:
R. F. Gaylord
Robt. H. Duncan

Inventor
John B. Root
by Saml. A. Duncan
Atty.

(No Model.) 3 Sheets—Sheet 2.

J. B. ROOT.
WELDING MACHINE.

No. 346,828. Patented Aug. 3, 1886.

Witnesses:
R. F. Gaford
Robt. H. Duncan

Inventor
John B. Root
by Paul A. Duncan
Atty.

(No Model.) 3 Sheets—Sheet 3.
J. B. ROOT.
WELDING MACHINE.
No. 346,828. Patented Aug. 3, 1886.
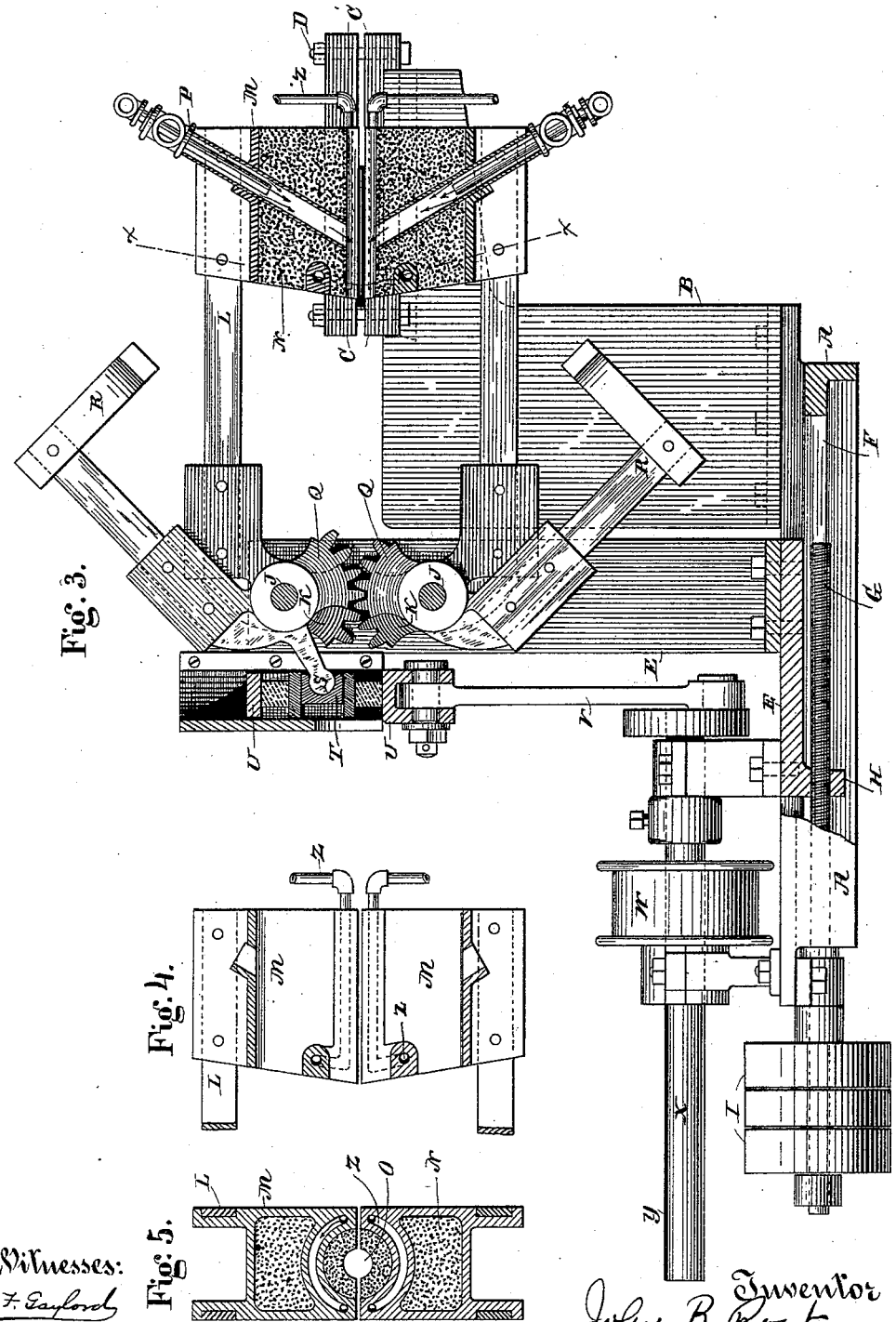
Witnesses:
R. F. Gaylord
Robt. H. Duncan
Inventor
John B. Root
by Saml. A. Duncan
atty.

UNITED STATES PATENT OFFICE.

JOHN B. ROOT, OF PORT CHESTER, NEW YORK.

WELDING-MACHINE.

SPECIFICATION forming part of Letters Patent No. 346,828, dated August 3, 1886.

Application filed June 27, 1885. Renewed April 19, 1886. Serial No. 199,423. (No model.)

*To all whom it may concern:*

Be it known that I, JOHN B. ROOT, of Port Chester, in the county of Westchester and State of New York, have invented certain new and useful Improvements in Welding-Machines, of which the following is a full, clear, and exact description, reference being had to the accompanying drawings.

The invention relates to machines for welding together sheet-metal blanks, whether flat or curved.

The invention consists in a clamp for holding the blanks that are to be welded together; a blow-pipe furnace which is made in two parts that are arranged and constructed so as to be brought in contact with the opposite sides of the blanks to inclose their overlapping edges, and to confine the action of the jets to such edges, and that have motion, when closed, along or across the blanks, to apply heat to the whole length or any part of such edges, and a welding mechanism arranged also to move along the heated edges of the blanks and operating to unite such edges, together with stationary driving mechanism for operating said furnace and said welding mechanism.

Figure 1:
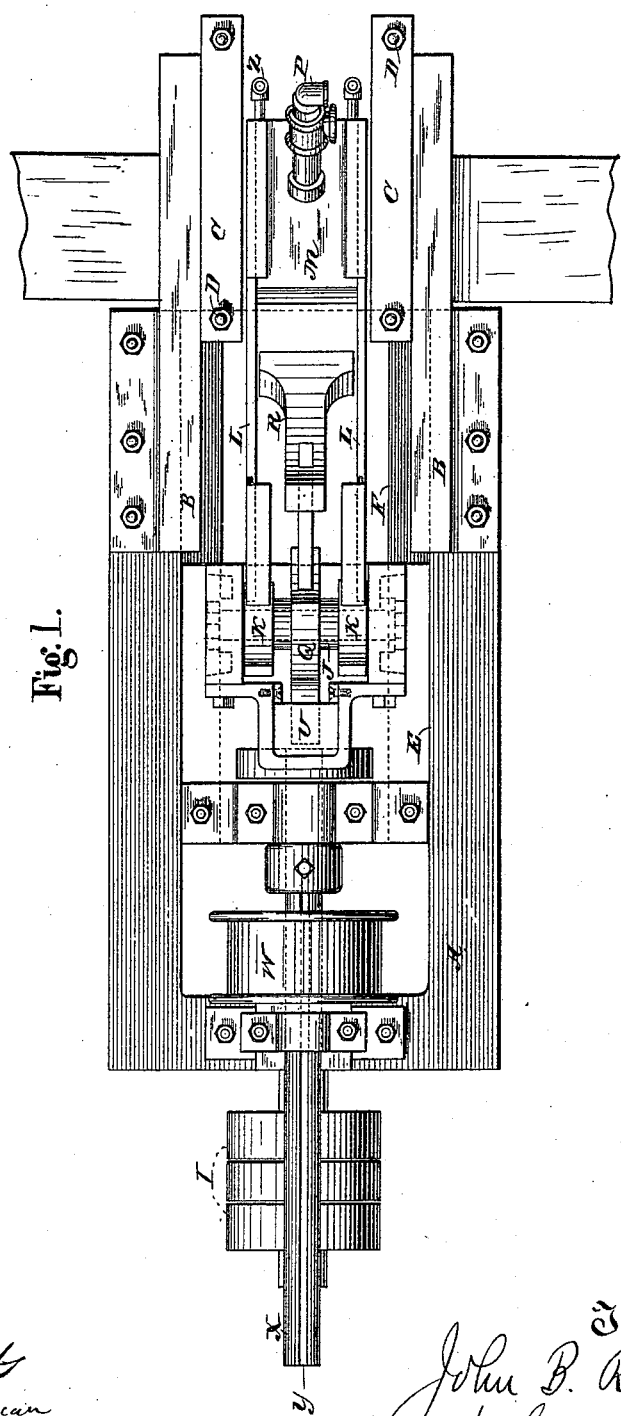
Figure 2:
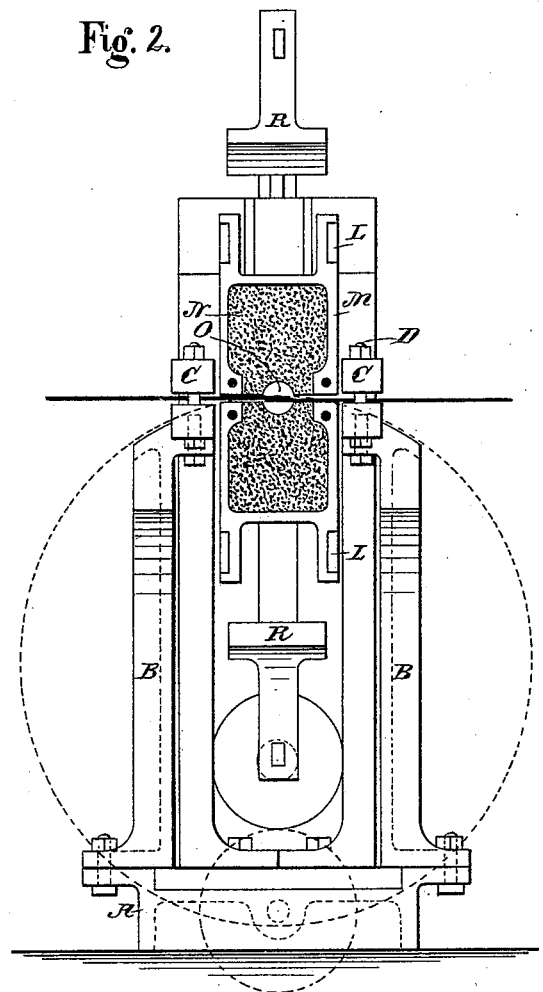

In the drawings, Figure 1 is a plan view of a machine embodying my invention. Fig. 2 is an end elevation thereof from the right of Fig.
1. Fig. 3 is an elevation view, the furnace and part of the welding mechanism being in central vertical section. Fig. 4 is a central section of the case or shell which holds the firebrick composing the furnace, and Fig. 5 is a section of the furnace on plane *x x*.

Referring to these views in detail, A is the bed of the machine. B is a bracket fixed thereto and supporting the clamping-bars C, the upper of which is made movable on the bolts D.

E represents a bracket, which carries the furnace and a hammering mechanism, and which slides on the ways F in the base of the machine, and is moved to and from the clamping-bars C, according as the fixed screw-shaft G, which engages the lug H on the bracket E, may be turned by the pulleys I. This traveling bracket carries the shafts J, on which are the geared hubs K, which support the separate halves of the furnace on arms L, each half of the furnace consisting of a shell or case, M, containing brick-work N, hollowed out, as shown at O, and a blow-pipe, P. The shafts J also carry other geared hubs, Q, which support the hammers R, S being an arm on one of said hubs Q, by which the hammers are operated, and which engages with a cushioning-block, T, moving laterally in the stirrup U, attached to the crank-rod V.

W is a pulley for driving the crank-rod shaft X, such pulley being fixed in bearings fast to the bed of the machine, and the crank-shaft being fixed in bearings fast to the traveling bracket and made longitudinally movable through its pulley while engaging therewith by means of the spline Y, and Z represents water-pipes running around the hollow heated portions of the furnace to keep the parts properly cooled, it being understood that these pipes are flexibly connected with some source of water, as also are the blow-pipes flexibly connected with proper fuel-receivers or generators.

The blanks to be welded together are placed in the clamping devices with their edges overlapping, and are held in such position by the closed clamp during the welding process. The furnace parts are then closed upon the blank, as shown in the third figure of drawings, and the blow-pipes are brought into action to heat the overlapping edges of the blanks. As the heating goes on, the furnace may be moved along the edges of the blank in order to bring the heating-jets in contact with any or all parts of such edges, this being done by operating the screw-shaft which moves the bracket carrying the furnace. When the heating has been accomplished, the furnace parts may be swung away from the blank, and the hammers brought into action and moved along the overlapping edges of the blank until they are thoroughly welded together; or the hammers may be operated at the same time that the heating is going on, one part of the edges of the blanks being hammered down and welded while another part is being heated, the application of the heat and the welding action being wholly under the control of the operator to apply as the case demands.

The large dotted circle of Fig. 2 indicates the position of a circular blank, such as a section of sheet-metal pipe. In the case of welding such pipe-blanks, or any blanks having special shapes, the faces of the welding devices will be made to conform to that of the blank, or to the shape to which it is desired to bring the blanks, and the shape of the furnace and clamping parts will also be correspondingly changed.

It is essential that the blow-pipes be inclosed or confined, so as to concentrate them and prevent their heat from being dissipated, by some means substantially like those shown—that is, I have found that an open blow-pipe or one whose jet is not inclosed will not suffice to quickly and uniformly heat the blank. The furnace structure shown and described, therefore, is an important adjunct to the machine and essential to its successful operation.

The devices here shown may be changed in various ways, and hence I do not limit myself to any particular form thereof, and the clamping devices may be operated by hydraulic or other power, or may in any other way be made automatic. Furthermore, it is manifest that the same results may be attained if the clamping devices be moved to and from the heating and welding mechanisms, instead of such mechanisms being moved toward the blank, as herein described. I am aware, however, that it is not new to use a hand-welding mechanism consisting of open blow-pipes and reciprocating hammers movably mounted upon a fixed support which is attached to and borne by the blank, such blow-pipes and hammers being moved and operated by hand mechanism, and I do not claim such a mechanism.

What is claimed as new is—

1. In a machine for welding sheet-metal blanks together, the combination of a clamp for supporting the blanks and holding them in position to be heated, blow-pipes for heating the edges of the blanks, and a furnace structure inclosing the blow-pipes and arranged to confine their action to the edges of the blanks, said blow-pipes and inclosing structure being mounted on traveling supports adapting them to be moved along the edges of the blank, substantially as described.

2. In a machine for welding sheet-metal blanks together, the combination of a clamp for holding the blanks in position to be heated, a heating apparatus consisting of two halves composed of fire-brick constructed to inclose the edges of the blank, each half being arranged upon opposite sides of the blank and mounted upon supports adapting the said halves to be moved to and from the blanks, substantially as shown and described.

3. In a machine for welding sheet-metal blanks together, the combination of a clamp for holding the blanks in position for heating and a heating apparatus consisting of two separate and movable parts or halves, each half being provided with a blow-pipe, and being arranged upon opposite sides of the blank and mounted upon supports adapting such halves to be closed upon and swung away from the blank.

4. In a machine for welding sheet-metal blanks together, the combination of a clamp for holding the blanks in position to be welded, a hammering mechanism arranged to operate upon both sides of the blanks and mounted upon traveling supports adapting it to be moved along the edges of the blank while operating to weld such edges, and stationary driving mechanism for operating said hammers and moving them along the blanks, substantially as described.

5. In a machine for welding sheet-metal blanks together, the combination of a clamp for supporting the blanks and holding them in position to be operated upon, blow-pipes for heating the edges of the blanks, a furnace structure inclosing the blow-pipes and arranged to confine their action to the edges of the blanks, and hammering mechanism for welding the heated edges together, said heating and welding mechanism being carried on traveling supports adapted to move them across the blank, substantially as described.

6. In a machine for welding sheet-metal blanks together, the combination of a fixed clamp for holding the blanks in position to be operated upon, a furnace constructed to confine its heating action to the edges of the blanks, a hammering mechanism for welding the said edges together, traveling supports carrying said furnace and said hammers, and stationary driving mechanism for moving the furnace and hammers along the edges of the blanks and for operating the hammers, substantially as described.

JOHN B. ROOT.

Witnesses:
R. F. GAYLORD,
ROBT. H. DUNCAN.